April 5, 1960  I. JEPSON ET AL  2,931,884
CONTROLLED HEAT COOKING VESSEL
Filed Jan. 23, 1957  4 Sheets-Sheet 2

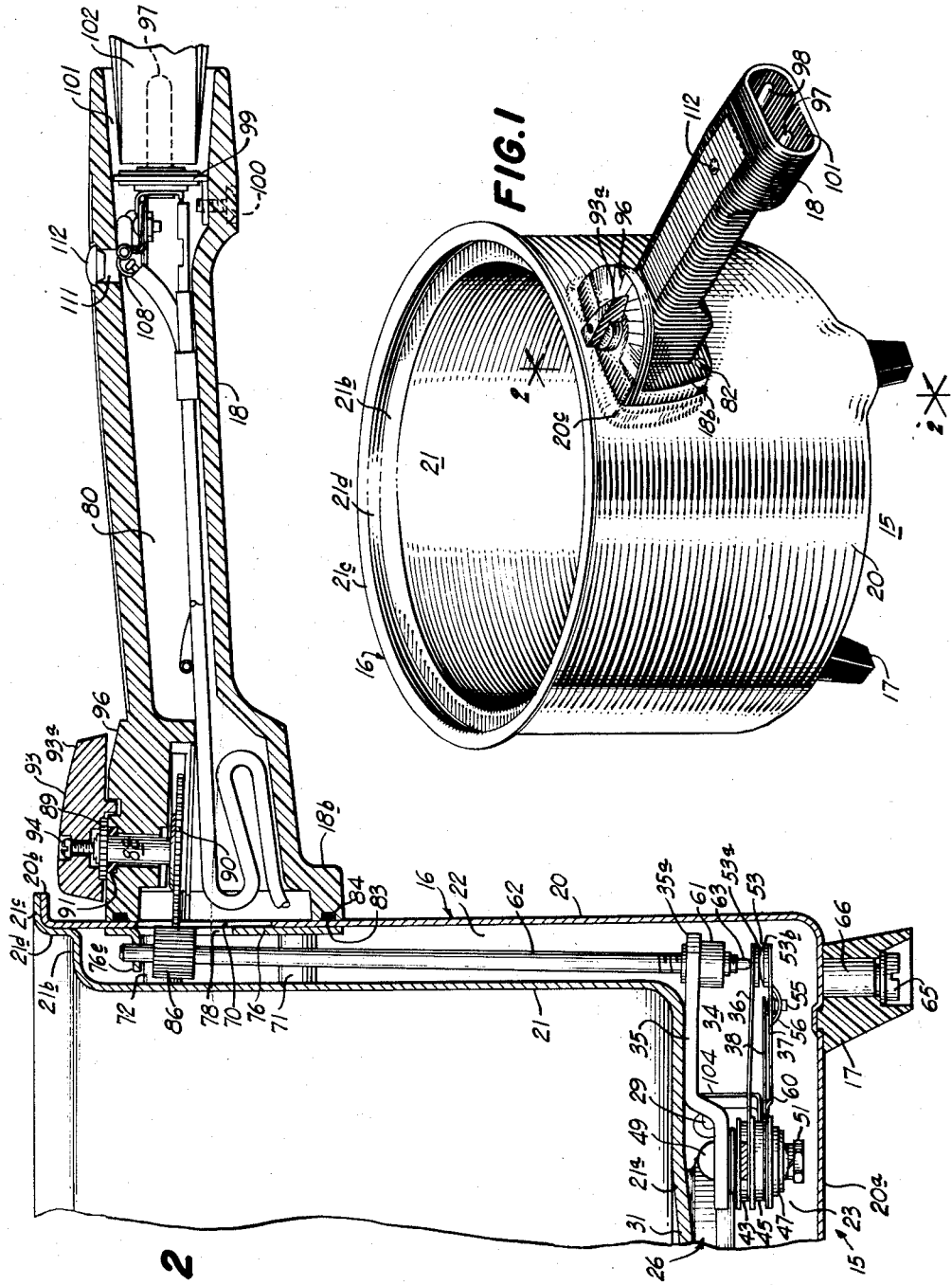

INVENTORS
IVAR JEPSON AND
LUDVIK J. KOCI
BY
George R. Clark
ATTORNEY

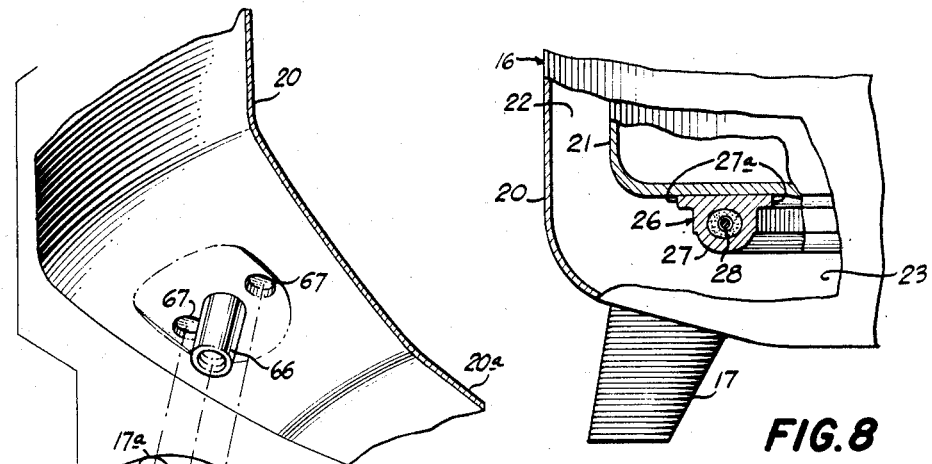
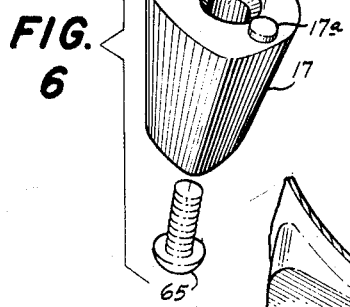
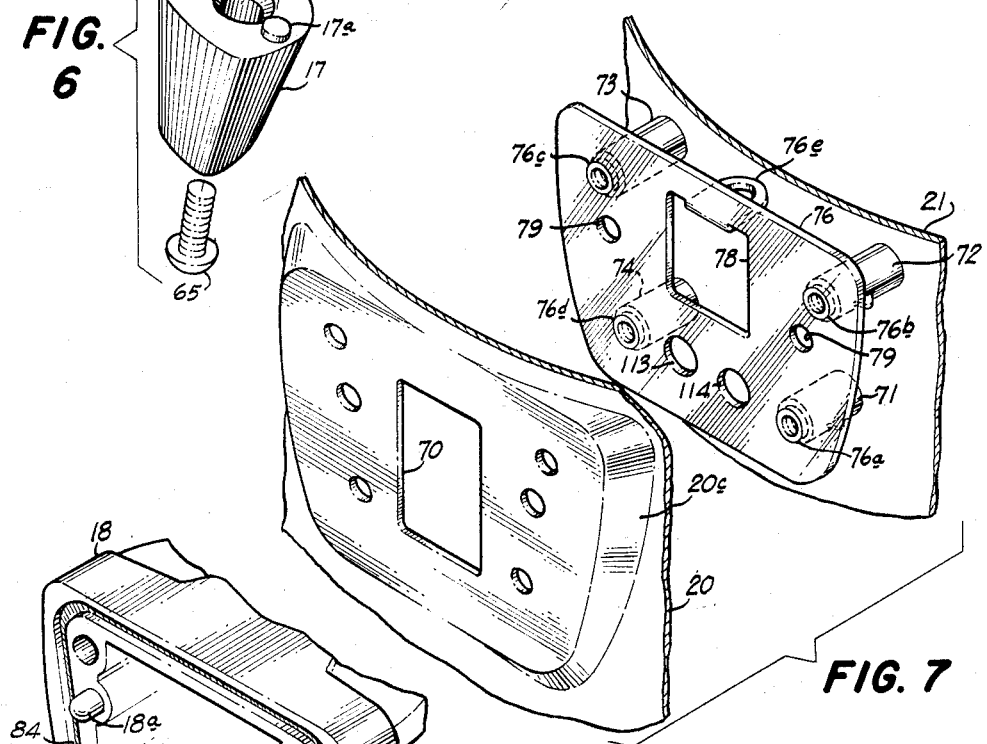
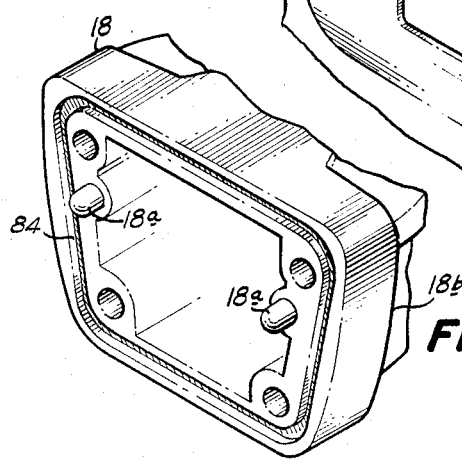
FIG. 6
FIG. 8
FIG. 7
FIG. 11
INVENTORS
IVAR JEPSON AND
LUDVIK J. KOCI
BY
George R. Clark
ATTORNEY April 5, 1960  I. JEPSON ET AL  2,931,884
CONTROLLED HEAT COOKING VESSEL
Filed Jan. 23, 1957  4 Sheets-Sheet 4

INVENTORS
IVAR JEPSON AND
LUDVIK J. KOCI
BY
George R. Clark
ATTORNEY

United States Patent Office 2,931,884
Patented Apr. 5, 1960

2,931,884
CONTROLLED HEAT COOKING VESSEL

Ivar Jepson, Oak Park, and Ludvik J. Koci, Hinsdale, Ill., assignors to Sunbeam Corporation, Chicago, Ill., a corporation of Illinois Application January 23, 1957, Serial No. 635,908

11 Claims. (Cl. 219—44)

The present invention relates to a cooking vessel and, more particularly, to a cooking vessel of the controlled heat type which has self-contained heating means together with suitable control means for maintaining the cooking or heating temperature at any desired selected value.

The kitchen range, as it has been known in the last decade whether of the electric or gas type, is gradually falling out of favor with the housewife for the reason that more efficient cooking means are now available. As far as surface cooking on such ranges is concerned, the practice has been to place a cooking vessel adjacent the surface unit whereby heat produced by the surface unit is transferred to the cooking vessel. It is at once apparent that the heat produced by such a surface unit, whether it be an electric heating element or a gas burner, varies widely depending upon the nature of the gas and gas pressure in the case of a gas range, or upon the voltage of the system in the case of an electric range. Thus, even though the valve of a gas range may be adjusted to an infinite number of positions and even though the heat produced by the surface unit of an electric range may be adjusted to a large number of settings, there is no assurance whatsoever that a constant head condition will obtain. It will be appreciated that many variables enter into the cooking picture with the kitchen range as it has been known heretofore. In the first place, various spacings exist between the cooking vessel and the surface unit. Obviously, a different heating effect will be obtained depending upon the space between the vessel and the heating unit. Moreover, air currents, which commonly exist in a kitchen, particularly since the modern kitchen is always provided with an exhaust fan, will cause variable heating due to convection currents and the like. Within the last several years it has been pretty well established that the heating unit should be incorporated directly into the cooking vessel itself. From a manufacturing standpoint, this has meant that most such cooking vessels are electrically heated vessels due to the ease with which an electric heating element can be made an integral part of such a vessel.

There have been on the market for some time cooking vessels of the type with which the present invention is concerned, and one commercially successful cooking vessel is disclosed and claimed in Jepson Patent No. 2,744,995, granted May 8, 1956, and assigned to the same assignee as the present application. Electric deep fat fryers of the type having a self-contained heating element associated therewith and including means for accurately controlling the temperature of such vessel have also been used to a somewhat lesser extent. Such a unit is disclosed in Jepson Patent No. 2,785,277, granted March 12, 1957, and also assigned to the same assignee as the instant application. There is, however, a need for an improved controlled heat cooking vessel which the housewife may use in the manner in which she uses the so-called conventional saucepan. The saucepan is extensively used for cooking cereals, macaroni, vegetables and the like, and is used at almost every meal. In connection with such cooking operations it is desirable to be able to cook by what is known as a simmer operation. This cooking operation requires maintaining the temperature at approximately boiling. If an accurately controlled cooking device is provided, such simmer operation can be accomplished without the requirement of stirring the food being cooked to prevent burning, as was necessary heretofore. It would be desirable to provide a controlled heat cooking vessel having what might be termed a simmer control, accurately maintaining the temperature within plus or minus five degrees when set at simmer temperature. Prior art devices heretofore tended to provide a control which gave much too wide a temperature fluctuation so that many times the vessel was at a temperature far above the temperature setting with resultant violent boiling, and at other times the temperature was far below the indicated setting.

It is the desire of every housewife to have cooking vessels which present a pleasing appearance both when in use and when in storage. It is, of course, a relatively simple matter for the manufacturer intially to make the vessel with a pleasing exterior surface. However, due to the high temperatures invloved in cooking operations, it is difficult to maintain the attractive exterior appearance of such vessels. It would be desirable, therefore, to provide a cooking vessel of double wall construction with an interspersed air space whereby the exterior of the vessel will be precluded from reaching the high temperatures to which the interior of the vessel is subjected. It would, moreover, be desirable to provide an arrangement whereby such vessel may be made of different materials as far as the exterior and interior thereof are concerned whereby a material resistant to corrosion by virtue of the foods cooked or heated may be employed for the interior, and a relatively scratchproof material which presents a very pleasing appearance may be used for the exterior.

Cooking vessels have been provided in which a keep-warm feature is included by the provision of a relatively low wattage independent heating element for this purpose. Unfortunately, such a heating element which is normally designed to operate continuously may not be capable of supplying the heat losses if a relatively large amount of food were placed in the vessel having a high heat dissipation factor. It would be desirable, therefore, to provide a controlled heat cooking vessel in which but a single heating element and a single temperature responsive element is employed and yet wherein very accurate temperature control may be obtained not only over a simmer range, but also over a wide range both above and below such a simmer range. It would also be desirable to provide a control which substantially eliminates contact arcing.

Accordingly, it is an object of the present invention to provide a new and improved cooking vessel having self-contained heating means and control means for maintaining any desired selected cooking temperatures.

It is another object of the present invention to provide improved temperature responsive control means for controlling accurately the temperature of a cooking vessel having built-in heating means.

Still another object of the present invention relates to a controlled heat cooking vessel having means to insure safe operation at simmer temperatures thereby eliminating stirring and also to provide satisfactory operation for a wide range of other temperatures.

It is another object of the present invention to provide an improved controlled heat saucepan which may be substantially wholly immersed in liquid for cleaning purposes.

It is a still further object of the present invention to provide an improved temperature responsive device which will maintain a uniform control with substantially no contact arcing.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

Fig. 1 is a perspective view of a controlled heat cooking vessel embodying the present invention;

Fig. 2 is a greatly enlarged fragmentary sectional view taken substantially on line 2—2 of Fig. 2;

Fig. 6 is an enlarged fragmentary exploded perspective view of a portion of the cooking vessel of Fig. 1;

Fig. 7 is an enlarged fragmentary exploded perspective view of another portion of the cooking vessel of Fig. 1;

Fig. 8 is a fragmentary view with certain portions cut away, somewhat similar to Fig. 4 but of another portion of the cooking vessel;

Fig. 11 is an enlarged perspective view of a portion of the handle of the cooking vessel of Fig. 1.

Figure 3:
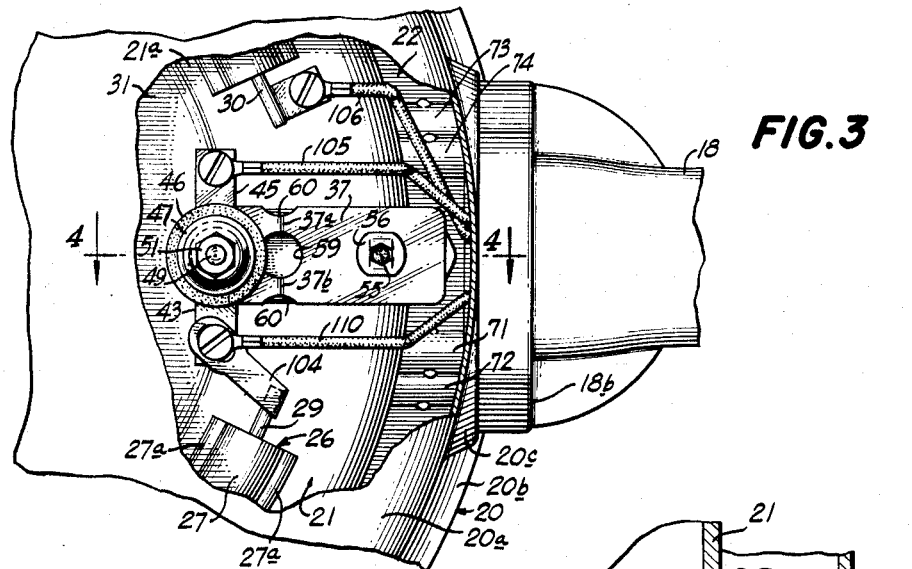
Fig. 3 is a fragmentary bottom view of the vessel of Fig. 1 with certain portions cut away better to illustrate the temperature control means of the present invention.

Briefly, the present invention is concerned with a controlled heat cooking vessel comprising a vessel formed of two nested containers defining an air space therebetween, which air space is completely sealed with respect to the entrance of moisture or the like while washing the vessel. A greatly improved temperature responsive control means is employed for insuring accurate temperature control of the vessel and completely avoiding any erratic operation due to contact arcing and the like. Simple control means for selectively controlling the temperature are provided in a hollow handle attached to the vessel by improved means and said control means are connected to the temperature responsive device in a manner so as to be completely sealed whereby the vessel may be immersed for washing purposes.

Referring now to the drawings, there is illustrated by way of example a cooking vessel generally designated by the reference numeral 15. This vessel is illustrated as being in the form of a saucepan and may be made in any sizes useful to the housewife. It might, for example, be manufactured in a size as small as one or two quarts or as large as five or more quarts. Two saucepans built substantially like the present invention have been made in a three-quart and a five-quart size, but, obviously, the size of the vessel is unimportant as far as the present invention is concerned. The design embodied in these saucepans is disclosed in Ernest design application, Serial No. 42,711, filed August 23, 1956, and assigned to the same assignee as the present invention.

The controlled heat cooking vessel 15 comprises a container generally designated at 16 to which are secured a plurality of supporting feet 17 whereby the same may be positioned in spaced relationship with a supporting surface. Also secured to the container 16 of the cooking vessel 15 is a laterally extending handle 18 which is suitably secured to the container 16 near the upper open end thereof.

In accordance with the present invention, the container 16 of the controlled heat vessel 15 is of double wall construction throughout and essentially comprises an outer container portion 20 and an inner container portion 21, as is best shown in Figs. 2 and 7 of the drawings. Preferably the elements 20 and 21 are drawn or spun in a manner so that the container portion 21 may be received or nested within the container portion 20 in a manner to define an annular chamber all around the vessel designated as 22, and a bottom chamber designated as 23 connected to the annular chamber 22 and disposed between the bottom 21a of the inner container portion 21 and the bottom 20a of the outer container portion 20.

In order to insure that the chamber portions 22 and 23 are completely sealed, the upper periphery of the container portion 20 is provided with an annular lateral flange 20b. The inner container portion 21, on the other hand, is provided with an annular stepped construction including annular horizontal ledges 21b and 21c, the annular ledge 21b providing a suitable annular support for a cover for the cooking vessel 15, which cover is not shown in the drawings but which may be similar to the cover shown in the above mentioned copending Jepson application. The portion 21c comprises a lateral flange so that when the container portions 20 and 21 are nested together as shown in Fig. 2 of the drawings the annular flange portions 20b and 21c are parallel and in face-to-face engagement. A short vertical section 21d of the container portion 21 interconnecting the annular portions 21b and 21c is shaped to be in face-to-face engagement with the upper part of the outer container portion 20 as best shown in Fig. 2 of the drawings.

Preferably the abutting faces of the container portions 20 and 21, and specifically the flanges 20b and 21c are welded thereby to provide a completely sealed chamber including the portions 22 and 23. Instead of welding it will be appreciated that a suitable seal between the vessels may be obtained by rolling the upper ends together and cementing the engaging surfaces somewhat in the manner employed in manufacturing sealed so-called tin cans. Numerous advantages are obtained by the double wall construction of the container 16 as described above. The double wall construction serves to insulate the outer container portion 20 from the inner container portion 21 and, consequently, the exterior of the vessel will be not nearly so hot as where a single wall construction is employed. This eliminates the problem of discoloration, which often occurs, and a very attractive vessel can be provided employing the construction of the present invention. Obviously, with the present construction radiation from the inner wall of the double wall construction, which is the heated portion of the container, as will become apparent from the following description, is greatly reduced. Additionally, it will be appreciated that by using a double wall construction it is possible to take advantage of the characteristics of the available materials, since the desirable features for the interior of a cooking vessel differ from the features of the exterior of a cooking vessel. The interior of any cooking vessel should be easy to clean and should be made from a material which is a very good conductor of heat and yet which is resistant to the various foods it may be subjected to, some of which are acid in nature. On the other hand, the exterior of the vessel of the present invention may be made of a material which presents a pleasing appearance or, in other words, is of a relatively hard and scratchproof material. The characteristics of the exterior as a conductor of heat are not important nor is its resistance to corrosion when subjected to foods of various natures such as acid foods or the like.

In order to supply the necessary cooking heat, there is secured to the underside of the bottom 21a of the inner container portion 21 a suitable heating element generally designated at 26. Preferably this heating element 26 is an aluminum sheathed heating element welded to the bottom 21a of the inner container portion 21 in accordance with the disclosure of copending Jepson application, Serial No. 545,727, filed November 8, 1955, entitled Electric Cooking Vessel and Method of Making Same, which application is assigned to the same asignee as the instant application. The sheathed heating element 26 is best shown in Figs. 2, 3 and 8 of the drawings and includes an outer sheath, preferably of aluminum, designated by the reference numeral 27 having a pair of lateral flanges 27a to facilitate welding the same to the cooking vessel. The sheath 27 is of C shape substantially to encompass the bottom 21a of the inner container portion 21 of the cooking vessel and to insure uniform heating thereof. Centrally disposed within the sheath 27 is a resistance element 28, shown best in the schematic diagram of Fig. 10 of the drawings. This resistance element 28 terminates in a pair of terminals 29 and 30, both of which are clearly visible in Fig. 3 of the drawings. These terminals extend outside the ends of the sheath 27. It will be understood that the space between the sheath 27 and the resistance element 28 is filled with a suitable material which is both a good electrical insulator and at the same time a good heat conductor. A suitable material for this purpose and commonly employed in such sheathed heating elements is fused magnesium oxide.

Figure 4:
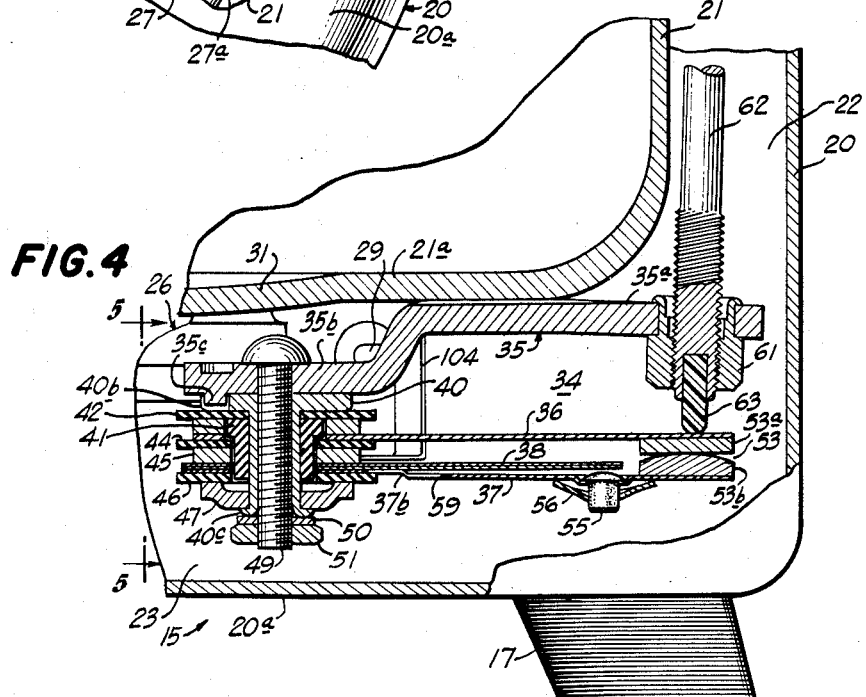
Fig. 4 is a greatly enlarged sectional view taken substantially along line 4—4 of Fig. 3, assuming that Fig. 3 shows the complete structure.

In accordance with the present invention the bottom 21a of the inner container portion 21 defining the cooking vessel 15 is dished downwardly at the center, as clearly indicated at 31 in Figs. 2 and 4 of the drawings, leaving an annular ring surrounding the dished center 31. This construction is employed to completely eliminate warping of this annular ring section of the bottom of the inner container portion which would occur if a flat bottom were employed. It will be appreciated that, for example, if a flat bottom were employed, differential expansion and contraction of the metal would cause the bottom to snap upwardly or downwardly with a sort of toggle action. By using the dished construction of the present invention to the center 31, it will move with expansion or contraction but the surrounding annular ring defining the rest of the bottom will remain unwarped. Thus control means may be secured thereto with assurance that warping will not adversely affect operation.

To provide the controlled heat desired in the cooking vessel of the present invention, temperature control means are provided, an important element of which is a switch and thermostat assembly generally designated at 34 and best shown in Figs. 2, 4, 5 and 9 of the drawings. Any temperature control to be satisfactory must respond accurately to the temperature of the food being cooked and, consequently, to the temperature of the bottom of the vessel which is in intimate heat exchange relationship with the food being cooked. To this end there is provided a mounting bracket 35 which is welded or otherwise secured to the underside of the cooking surface or, in other words, to the bottom 21a. This bracket 35 is secured to the bottom 21a and specifically to the annular ring surrounding the dished portion 31 whereby it is in good heat exchange relationship with the bottom and yet will not be moved by virtue of warping of the bottom. It is furthermore secured to the bottom in a manner so that the end 35a thereof projects into the chamber portion 22, and the end 35b thereof, which is disposed in a slightly different plane from the end 35a, is disposed beneath the bottom 21a and somewhat spaced therefrom. Suitably supported from the end 35b of the bracket 35 are a pair of switch blades 36 and 37 and a bimetallic element 38. These three elements extend in generally parallel relationship and have corresponding ends thereof secured together in a suitable assembly supported from the bracket 35.

Figure 5:
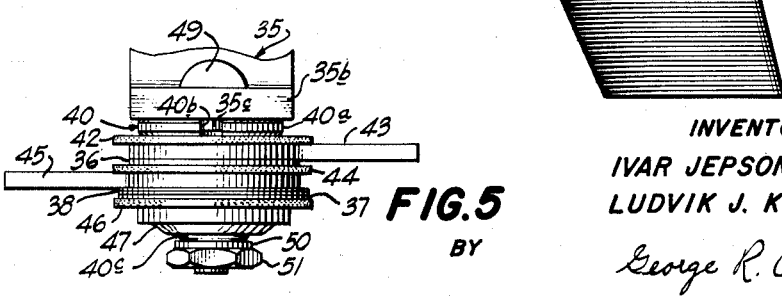
Fig. 5 is a view looking in the direction of the arrows 5—5 of Fig. 4, assuming that Fig. 4 shows the complete structure.
Figure 9:
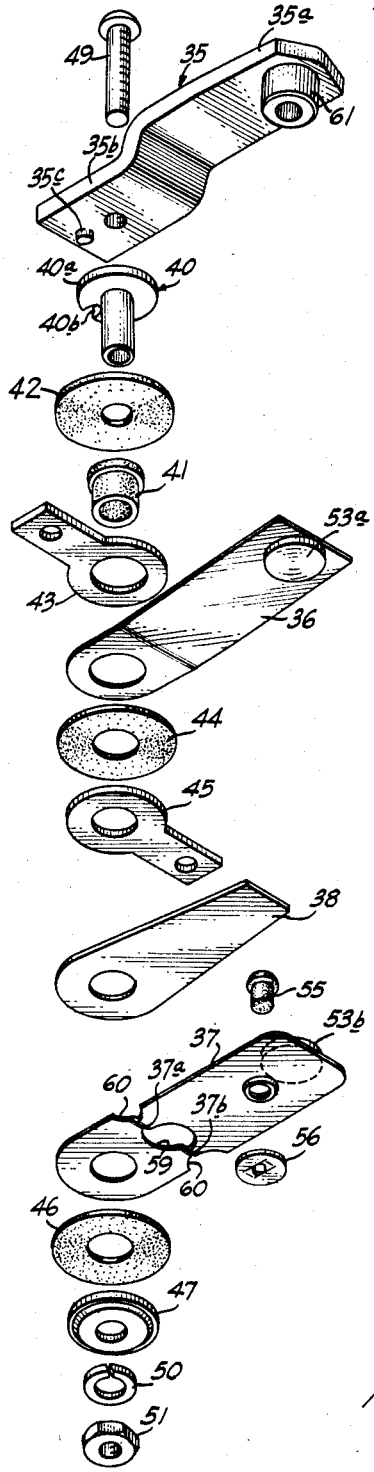
Fig. 9 is an exploded perspective view of the temperature responsive control means of the present invention.

The assembly just mentioned, best shown in Figs. 4, 5 and 9 of the drawings and starting with the top, comprises a thermostat post 40, an insulating washer 42, an insulating bushing 41, a first terminal 43, the switch blade 36, an insulating washer 44, a second terminal 45, the bimetallic element 38, the switch leaf 37, an insulating washer 46, and a dished end washer 47. The thermostat post 40 is essentially a sort of hollow rivet with a head 40a having a notch 40b therein. The post 40 is designed to extend through the stack of elements each of which has a suitable opening for this purpose, and the end of the rivet is peened over as indicated at 40c in Fig. 4 of the drawings to hold the elements 36, 37, 38 and 40 to 47, inclusive, in stacked assembled relationship. It will be clear that the first terminal 43 is in conducting relationship with the resilient or flexible switch blade 36, and the two are completely insulated by the bushing 41 and the insulating washers 42 and 44 from the other conducting elements in the switch assembly. Similarly, the second terminal 45 is disposed in conducting engagement with both the bimetal 38 and the resilient switch blade 37, which, in turn, are electrically insulated by the bushing 41 and insulating washers 44 and 46 from all other conducting means in the switch assembly, including the supporting means. As is best shown in Figs. 4 and 5 of the drawings, the thermostat post clamps the assembly in a manner so that the terminal 43 projects to one side of the stack and the terminal 45 to the other side of the stack, while the switch blades 36 and 37 and the bimetallic element 38 extend in the same general direction and substantially perpendicular to the longitudinal axes of the projecting portions of terminals 43 and 45.

For the purpose of supporting the switch assembly just described in a predetermined manner from bracket 35, the end 35b of the bracket is provided with a suitable opening for receiving a screw 49 or other similar fastening means, which extends through the hollow thermostat post 40. A suitable lock washer 50 and nut 51 are provided so that the switch assembly may be firmly secured to the bracket 35. For proper orientation, however, the bracket 35 is provided with a downwardly directed protrusion 35c which is receivable in the notch 40b of the thermostat post 40 thereby positioning the switch blades 36 and 37 so as to extend in a generally parallel direction with the bracket 35 whereby the three ends of the switch blades 36 and 37 are disposed generally beneath the end 35a of the bracket 35.

To perform the desired switching operation, the thermostat assembly 34 includes a switch generally designated as 53 comprising relatively movable contacts 53a and 53b, respectively. As illustrated, the contacts 53a and 53b are supported on adjacent faces of the free ends of switch blades 36 and 37, respectively, and when the switch is closed, as indicated in Fig. 4 of the drawings, an electrical circuit is completed between terminals 43 and 45.

In order that the bimetallic element 38 may open the switch, the free end of the bimetallic element lies over but normally is slightly spaced from an insulating button 55 which is inserted in a suitable opening provided in switch blade 37. Suitable clamping means 56 hold the insulating button 55 in assembled relationship with the switch blade 37. The high expansion side of the bimetallic element 38 is on the top, as viewed in Fig. 4 of the drawings, so that upon heating thereof the element will deflect downwardly to move the switch contact 53b away from switch contact 53a. The switch blades 36 and 37 are inherently biased in a manner so that the switch 53 is open, and, as will be described hereinafter, when it is desired for the switch 53 to be closed, the upper contacts 53a, as viewed in Fig. 4 of the drawings, is moved downwardly into engagement with contact 53b.

As was mentioned above, the temperature control means of the controlled heat cooking vessel 15 must be capable of being set for any temperature within a fairly wide range, while at the same time being capable of accurately controlling a simmer temperature. The control described thus far will accurately maintain a simmer temperature just at the point of boiling. Prior art devices have been constructed so that violent boiling occurs for a short time and then the temperature drops so that no boiling occurs, with the resultant alternate periods of violent boiling and no boiling. This is undesirable and the present invention provides an arrangement whereby the temperature is constantly maintained just at boiling, if desired, with no violent agitation of the material being cooked. One of the reasons for the erratic operation of prior art devices was the fact that the bimetallic element was employed as a current conductor with one of the contacts mounted thereon. The arcing which occurred upon the opening of the switch produced a substantial amount of heat. As a matter of fact, such cooking vessels have a heating unit in excess of one thousand watts, and that means that a substantial current of the order of ten or more amperes is interrupted. The resultant arcing in prior art devices, particularly if they cycled rather rapidly, causes substantial heating at the time the circuit was both being made and interrupted with the result that erratic operation due to such arcing occurred. As will become apparent from the ensuing description, the present arrangement completely eliminates these disadvantageous effects of the prior art and accurate temperature control over a wide range plus accurate simmer control is obtained with the single bimetallic element 38 and the single heating element 28.

To obtain accurate simmer control, it is necessary to employ a rapidly cycling thermostat so that there will be a minimum amount of overshoot. If the cycling is too slow, obviously, as in the prior art arrangements, the contents of the vessel would intermittently boil vigorously and cool well below boiling rather than maintaining a constant simmer temperature. Any rapidly cycling thermostat introduces the problem of contact wear. If, upon contact separation, fairly rapid movement of the contacts occurs, then, of course, contact wear is greatly reduced. The arrangement described above causes the contact 53b to move quite rapidly at the instant of contact separation as well as just prior to contact closing, and this is accomplished by virtue of two distinct heating effects of the bimetal 38. The first heating effect of the bimetallic element 38 occurs by virtue of the temperature transmitted thereto from the bottom 21a through the bracket 35. The second heating effect is produced by current flow through the leaf spring 37, which has a portion thereof in intimate heat exchange relationship with the bimetallic element 38. The leaf spring 37 is preferably formed of a material such as stainless steel which has a certain amount of resistance. To create a higher resistance path, the leaf spring 37 is provided with a substantial opening 59 therein together with notched portions 60 on either side of the opening so as to define two rather restricted conducting paths 37a and 37b, thus creating a higher resistance. Furthermore, the leaf spring 37 is shaped so that the fixed portion up to the notches 60 is in intimate heat exchange relationship with the bimetallic element 38. The flow of current through the restricted sections 37a and 37b of leaf spring 37 produces a heating effect of the leaf spring 37 and, consequently, of the bimetallic element 38 whenever current flows through the heating element 28. Thus, as the temperature of the contents of the vessel by virtue of the heat transmitted through bracket 35 tends to cause opening of the switch 53, the additional heating effect on bimetallic element 38 by virtue of the restricted portions 37a and 37b of leaf spring 37 causes relatively rapid deflection at the instant of switch opening so that very little arcing occurs. In the normal closed position of switch 53 the end of the bimetallic element 38 is spaced a few millimeters from the insulating button 55, as indicated in Fig. 4 of the drawings. As heating occurs, the bimetal of course deflects downwardly, and by the time it reaches the button 55 to cause movement of contact 55b it is moving quite rapidly, and due to the lag in response by virtue of the heat transmitted through the bracket 35 such opening movement will continue to full opening of the switch 53 with little or no arcing. The lag in response is, of course, caused by the inclusion of the insulating washers 42 and 44, and the bushing 41 in the heat path between the bracket 35 and the bimetal 38. It will be appreciated that the same situation exists upon closing of the switch 53. The bimetal 38, of course, begins to cool after a very slight lag when the switch 53 is open, and the cooling action increases rapidly, since with no current flowing there is no heating by virtue of current flow through the restricted sections 37a and 37b. Thus, as the contacts of the switch 53 approach the closed position, contact 53b is moving relatively quickly so that closure of the switch occurs with negligible arcing. The overshoot which occurs again permits the bimetallic element 38 to move to the position of Fig. 4 with the end thereof spaced slightly from the insulating button 55. The rate of cycling is, of course, determined by the restrictions 37a and 37b which may be adjusted to give any desired rate. It will be apparent that the effect of contact arcing, even if it were present, is eliminated with the present arrangement, since such arcing will heat the end of the leaf spring 37, which is remote from the bimetallic element 38 and out of contact therewith. Actually, of course, arcing is substantially eliminated.

With the above-described arrangement it will be apparent that there has been provided a very accurate control for a controlled heat cooking vessel whereby the contents of the vessel may be maintained at simmer temperature without the overshoot and undershoot in temperature which occurs with prior art devices. Also, by employing the main heating element 28 for providing the simmer heat there is always sufficient heat available regardless of the quantity of food which it is desired to maintain at the simmer temperature, thus solving the problem existing where constantly energized low wattage elements were employed for such simmer heat in prior art devices. It will, furthermore, be apparent that, by use of the dished construction 31 of the bottom 21a of the cooking vessel as described above, no wrapping will occur to cause displacement of the temperature responsive switch assembly 34. This feature will become more apparent as the manually selectable control for the temperature responsive switch mechanism 34 is described.

For the purpose of selectively controlling the temperature at which the switch 53 is actuated and, consequently, the particular temperature at which the contents of the cooking vessel are maintained, means are provided to control the initial position of contact 53a. To this end there is supported on the end 35a of bracket 35 a suitable control rod nut 61 having a threaded opening for receiving the threaded end of a control rod 62 which extends in a generally vertical direction within the chamber 22. As best shown in Fig. 2 of the drawings, the control rod 62 extends substantially to the upper end of the chamber 22. The lower end of the control rod 62 is provided with an insulating end 63 engageable with the leaf spring 36. Rotation of the control rod 62 will, of course, selectively position the contact 53a. In accordance with the present invention, the distance between the control rod nut 61 and the leaf spring 36 is very short so that any change in temperature of the control rod 62 causing expansion or contraction thereof will have a negligible effect on the setting of the temperature responsive switch 34.

Before considering the mechanism for rotating or causing movement of control rod 62, consideration will first be given to the feet 17 and handle 18 and their association with the container 16 of the cooking vessel 15. As best shown in Figs. 2 and 6 of the drawings, the feet 17 are preferably molded from a suitable phenolic resin and are provided with a central opening to accommodate a suitable fastening means 65. Preferably the vessel is provided with a plurality of studs 66 welded thereto at spaced points around the bottom, which studs have threaded openings for receiving the fastening means 65. In order that that the feet 17 may be held in position by a single screw such as 65, the bottom of the outer vessel portion 20a is provided adjacent the stud 66 with a pair of depressions 67 for receiving therein projections 17a integrally formed with the feet 17. These projections 17a are held in the depressions 67 by the screw 65 and thus prevent rotation about the axis of the studs 66.

To provide a strong support for the handle 18 whereby the vessel may be carried around by the handle 18, there is disclosed an improved mounting construction for the handle which incidentally also includes an access opening to the chamber 22, which in turn is connected to the chamber 23. This access opening to chamber 22 is designated by the reference numeral 70 and is the only opening into the sealed chamber. Moreover, this opening is near the upper part of the container 16. In order to provide a rigid support for the handle 18 there are provided a plurality of studs designated as 71, 72, 73 and 74. These studs extend between the walls of the container portions 20 and 21, respectively. Actually, the ends of the studs 71, 72, 73 and 74 adjacent the wall of container portion 21 are suitably welded thereto and the other ends thereof extend into suitable openings defined in a handle mounting plate 76 which has four openings 76a, 76b, 76c and 76d for respectively receiving reduced ends of the studs 71, 72, 73 and 74, respectively.

During the manufacturing operation the studs 71 to 74, inclusive, are preferably first welded to the outside of the inner container portion 21, and when this welding operation is completed the studs are placed in a suitable jig whereupon the ends not secured to the inner vessel have shoulders formed thereon to a sufficient extent so that these reduced ends may be received into the openings 76a, 76b, 76c and 76d in the handle mounting plate 76. The handle mounting plate 76 is further provided with an enlarged central opening 78 overlying a part of the opening 70 in the outer vessel portion 20. Additionally, the mounting plate is provided with a pair of openings 79 for receiving positioning studs 18a integrally formed on the end of the handle 18, which is preferably molded from a suitable phenolic resin or the like. The outer vessel portion 20 is provided with a deformation 20c (see Figs. 1, 3 and 7) which provides a flat surface for engagement with the end of the handle 18. In accordance with the present invention, the handle 18 is hollow and has a suitable chamber 80 defined therein.

The end of the handle adjacent the container portion 16 is provided with a flange 18b for accommodating suitable fastening screws 82 which are adapted to extend through the wall of the outer container portion 20, through the mounting plate 76 and into threaded engagement with the longitudinally extending threaded openings defined in the studs 71 to 74, inclusive. To provide a suitable seal at the junction between the handle 18 and the container portion 16, a suitable silicone impregnated O-ring or gasket 83 is provided which is preferably disposed within a recess 84 defined in the face of the flanged portion 18b of the handle 18, so that the gasket is compressed and provides a suitable seal to prevent the entrance of moisture or the like at the junction of the handle 18 and the outer wall of container 16. In this way the chamber 80 and the chamber 22 are interconnected by virtue of the openings 70 and 78 described above. With the above-described arrangement it will be apparent that the handle 18 is firmly secured to the container 16.

To provide an upper bearing for the movable control rod 62, the handle mounting plate 76 is preferably provided with a tongue portion 76e which is bent at right angles to the plane of the handle mounting bracket 76. This tongue portion is provided with a suitable opening to receive the upper end of the control rod 62, this opening being disposed along the longitudinal axis of the control rod. So that the control rod may be driven, there is preferably secured thereto a suitable gear or pinion 86 which is disposed adjacent the aligned openings 70 and 78. This pinion has teeth extending a substantial distance along the longitudinal axis of the rod 62 so that vertical movement of the rod 62, which occurs by virtue of the threaded end thereof disposed in control rod nut 61, will not cause it to come out of engagement with suitable driving means to be described hereinafter.

For the purpose of selectively positioning the control rod 62 and, hence, for determining the operating temperature of the controlled heat cooking vessel 15, there is rotatably journalled through the wall of the handle 18 a suitable control knob shaft 88. This control knob shaft is illustrated as being disposed in a vertical direction and having a calibration pinion 89 secured to the end thereof extending outside the handle and a spur gear 90 secured to the end thereof disposed within the chamber 80. The spur gear 90 is of such diameter as to drivingly engage the gear 86 whereby rotation of control knob shaft 88 will cause relative rotation of the control rod 62. For the purpose of insuring against the entrance of any moisture through the opening in the handle 18 which accommodates the control knob shaft 88, the upper end of this opening is chamfered to receive a suitable O-ring sealing washer 91 which is clamped into sealing engagement with the underside of the calibration pinion 89 and the adjacent portion of the handle 18.

In order to operate the control knob shaft 88, a suitable control knob 93 is secured to the calibration pinion 89 by suitable fastening means 94. Preferably the knob 93 has a pointerlike projection 93a for cooperating with a suitable dial 96 defined on a cooperating portion of the handle 18. The dial will include certain indicia such as "Off," "Simmer," and certain temperature settings up to 400° F. and the like. Obviously, when the knob 93 is moved to the "Off" position, the control rod 62 will have been moved in a vertical direction to such an extent that switch 53 is opened. If desired, the handle 18 may be provided with suitable indicia indicating certain cooking operations and control settings of the knob 93 such as is disclosed in Jepson Patent No. 2,744,995 referred to above.

Figure 10:
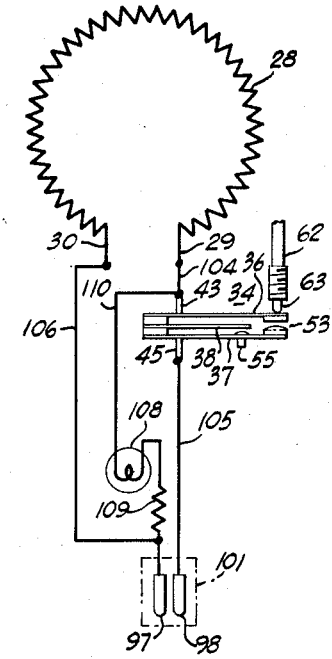
Fig. 10 is a schematic diagram showing the electrical control circuit of the cooking vessel of the present invention.

For the purpose of permitting electrical connections to be made with the heating element, and specifically with the resistor 28 of Fig. 10 of the drawings, a pair of male type bayonet terminals 97 and 98 are mounted within the chamber 80. Actually, the chamber 80 extends throughout the length of the handle 18, but a suitable L-shaped mounting plate 99 is provided which is supported by screws or fastening means 100 near the end of the handle 18 remote from the container portion 96. This mounting plate 99 effectively closes the handle and defines the end of the chamber 80. It also defines a plug receptacle recess 101 which is merely an extension of chamber 80 into which the terminals 97 and 98 extend. These terminals 97 and 98 are rigidly supported from the mounting plate 99 in insulated relationship therewith. Thus, electrical connection with an external electrical circuit can be made by means of a suitable plug receptacle 102 which may be inserted into the recess 101 in a conventional fashion well understood by those skilled in the art.

The electrical circuit including the recess 101 is schematically illustrated in Fig. 10 of the drawings, and the corresponding parts are designated by the same reference numerals as in the preceding figures. As there illustrated, the terminal 43 of the switch assembly 34 is connected by a suitable conductor 104, with the terminal 29 of the resistor 28 defining the heating element for the cooking vessel. The terminal 45 of the switch assembly 34 is connected by a conductor 105 with the male type bayonet terminal 98. The terminal 30 of the resistor 28 is connected by a suitable conductor 106 directly with the terminal 97.

For the purpose of providing an indication of whether or not current is flowing through the heating element 28, a suitable indicating lamp 108 is provided. Preferably this lamp 108 is a neon lamp connected in series with a suitable current limiting resistor 109. The serially arranged lamp 108 and resistor 109 are connected between the terminal 97 and the switch terminal 43 by means of a suitable conductor 110. Thus, whenever the switch 53 is closed, the lamp 108 will be energized, and when the switch is open the lamp will be deenergized. Preferably and as best shown in Fig. 2 of the drawings, the lamp 108 is disposed beneath a suitable opening 111 in the handle 18, which opening is closed by a suitable lamp lens 112, the condition of the cooking vessel 15 being thus clearly indicated to the user at all times. The lens 112 is preferably formed of a clear plastic such as Lucite or the like. It will be understood that conductors 105, 106 and 110 will extend from the chamber 23 through the chamber 22 into the chamber 80. For this purpose the handle mounting plate 76 is preferably provided with a pair of openings 113 and 114 through which these conductors may extend in going from chamber 22 to chamber 80. The edges of the openings 113 and 114 are preferably rounded and freed of any burs so no damage to the insulating enclosing the conductors will occur. Moreover, these openings will guide the conductors and prevent them from interfering with the proper operation of the gears 86 and 90.

In the larger size cooking vessels it may be desirable to provide a suitable additional handle means on the side of the vessel opposite to that to which the handle 18 is secured. This has not been shown in the drawings, but it will be appreciated that a very short L-shaped member of insulating material may be secured thereto to enable a housewife to grasp the cooking vessel on either side in the event a large vessel is involved. Such handles are shown in the above-mentioned Jepson application, Serial No. 316,209. Obviously, with a small size vessel this is not necessary.

In view of the detailed description included above, the operation of the controlled heat cooking vessel of the present invention will be understood by those skilled in the art. It will, moreover, be appreciated that there has been provided a completely automatic cooking vessel which is completely sealed so that it may be immersed in liquid for cleaning purposes up to the lens 112 in the handle. The device furthermore provides any desired selected cooking temperature and, in addition, provides accurate simmer control whereby the vessel will maintain any material being cooked at the verge of boiling or just at the boiling point. Any expansion or contraction of the rod 62 with heating and cooling will not affect the calibration of the temperature control by virtue of the close spacing of nut 61 and switch leaf 36. Furthermore, by virtue of the dished construction of the bottom 21a, warping of the bottom and its consequent adverse effect on the switch assembly is eliminated.

While there has been illustrated and described a particular embodiment of the invention, various changes and modifications will occur to those skilled in the art and it is intended by the appended claims to cover all such changes and modifications as fall within the true spirit and scope of the present invention.

What is claimed as new and desired to be secured by Letters Patent of the United States is:

1. A cooking vessel immersible in liquid for cleaning purposes comprising, a double wall container defined by a pair of nested inner and outer members each closed at the bottom and open at the top, said members being joined at the top to define a first chamber between the closed bottoms thereof and a second chamber connected to said first chamber and completely surrounding said inner member, electric heating means disposed in said first chamber and supported in heat exchange relationship with said inner member, a hollow insulating handle, means defining an opening in said outer member leading directly into said second chamber, means for securing one end of said handle to said container with the hollow of said handle connected to said chambers through said opening, means for sealing the junction between said handle and container against the entrance of moisture or the like, temperature responsive switch means disposed in said first chamber, supporting means for supporting said last mentioned means from the bottom of said inner member, said temperature responsive switch means including a pair of relatively movable switch contacts, a rotatable control rod for selectively positioning one of said contacts having one end threaded in said supporting means, said rod extending within said second chamber from said one contact to said opening, manually actuatable means mounted on said handle, and means for drivingly interconnecting said last mentioned means and said control rod.

2. The combination of a heating vessel immersible in liquid for cleaning purposes comprising, a double wall container defined by a pair of nested inner and outer cylindrical members each closed at the bottom and each provided with an annular laterally projecting flange at the top thereof, said inner cylindrical member having its annular laterally projecting flange resting on the annular projecting flange of said outer member, means for sealing the junction between said cylindrical members at said flanges to define a first chamber between the closed bottoms thereof and a second annular chamber connected to said first chamber and completely surrounding said inner cylindrical member, electric heating means disposed in said first chamber and supported in heat transfer relationship with said inner member, a hollow insulating handle, means defining an opening near the top of said outer cylindrical member leading directly into said annular chamber, means for securing one end of said handle to said container with the hollow of said handle connected to said chambers through said opening, gasket means for sealing the junction between said handle and container against the entrance of moisture or the like, temperature responsive switch means disposed in said first chamber, supporting means for supporting said last mentioned means from the bottom of said inner cylindrical member, said temperature responsive switch means including a pair of relatively movable switch contacts, the bottom of said inner cylindrical member being dished to eliminate warping and its adverse effect on said supporting means, a rotatable control rod for selectively positioning one of said contacts having one end threaded in said supporting means, said rod extending at least to said opening, manually actuatable means on said handle and including a shaft extending into the hollow of said handle, and gear means for drivingly interconnecting said shaft and said control rod.

3. A cooking vessel immersible in liquid for cleaning purposes comprising, a double wall container, a hollow insulating handle, means defining an opening in the outer wall of said container leading to a chamber defined between the walls thereof, an electric heating element disposed in said chamber in heat transfer relationship with only the inner wall of said container, means for securing one end of said handle to said container with the hollow of said handle connected to said chamber through said opening, means for sealing the junction between said handle and container against the entrance of moisture or the like, temperature responsive switch means disposed in said chamber, supporting means for supporting said last mentioned means from said inner wall of said container adjacent the bottom thereof, said temperature responsive switch means including a pair of relatively movable switch contacts, and a rotatable control rod for selectively positioning one of said contacts having one end threaded in said supporting means, said rod extending from said one contact at least to said opening, the length of said control rod between said one contact and said supporting means being very short whereby changes in temperature of said rod will have a negligible effect on the operation of said temperature responsive means.

4. In a self-contained controlled heat cooking vessel, a container having a first chamber defined beneath the cooking surface thereof, an electric heating element wholly disposed in said chamber in heat transfer relationship with said cooking surface, an insulating handle, means for securing one end of said handle to said vessel, means defining a handle chamber in said handle, a vertically disposed passageway interconnecting said first chamber and said handle chamber, means for sealing the junction between said handle and container against the entrance of moisture or the like, temperature responsive switch means disposed in said first chamber, supporting means within said chamber for supporting said last mentioned means from the cooking surface of said container, said temperature responsive switch means including a pair of relatively movable switch contacts, a vertically positioned rotatable control rod disposed in said passageway and movable along its longitudinal axis for selectively positioning one of said contacts having one end threaded in said supporting means, said rod extending from said one contact to the junction of said handle and said container, the length of said control rod between said one contact and said supporting means being very short whereby changes in temperature of said rod will have a negligible effect on the operation of said temperature responsive means.

5. A cooking vessel immersible in liquid for cleaning purposes comprising, a double wall container defined by a pair of nested inner and outer cylindrical members each closed at the bottom and open at the top, said members being joined at the top to define a first chamber between the closed bottoms thereof and a second annular chamber connected to said first chamber and completely surrounding said inner cylindrical member, electric heating means disposed in said first chamber and supported in heat exchange relationship with said inner member, a plurality of studs disposed within said annular chamber and extending between said inner and outer members, means for securing the ends of said studs adjacent said inner member to said inner member, a handle mounting plate including a plurality of spaced openings for receiving the ends of said studs not secured to said inner member, an insulating handle, and means engageable with studs for securing said handle to said container.

6. In a self-contained controlled heat cooking vessel, a double wall container having a chamber defined between the double walls thereof, an electric heating element disposed in said chamber beneath the cooking surface of said container in heat transfer relationship therewith, an insulating handle, means for securing one end of said handle to said vessel, means defining a handle chamber in said handle, a passageway interconnecting said chamber and said handle chamber, means for sealing the junction between said handle and container against the entrance of moisture or the like, temperature responsive switch means disposed in said chamber, supporting means within said chamber for supporting said last mentioned means from the cooking surface of said container, said temperature responsive switch means including a pair of relatively movable switch contacts, a bimetal included in said temperature responsive switch means for controlling said relatively movable contacts, resilient means for supporting one of said contacts, said resilient means having a portion thereof in intimate heat transfer relationship with said bimetal, and means for heating said portion of said resilient means in response to current flowing through said contacts.

7. In combination with a heat conducting member, electric heating means in heat transfer relationship with said member, an electrical circuit for controlling the energization of said heating means including temperature responsive switch means comprising a bimetallic element mounted on said heat conducting member so as to be responsive to the temperature thereof, said switch means including a resilient member having a movable contact supported thereon, means for mounting the corresponding ends of said bimetallic element and resilient member on said heat conducting member with portions thereof adjacent said ends in constant physical engagement to provide intimate conductive heat exchange relationship therebetween, and means for providing an effective resistance to the flow of electric current through said resilient member thereby to cause heating of said bimetallic element by virtue of said intimate heat exchange relationship.

8. In combination with a heat conducting member, electric heating means in heat transfer relationship with said member, an electrical circuit for controlling the energization of said electric heating means including temperature responsive switch means comprising a pair of resilient contact arms and a bimetallic element all having relatively fixed ends mounted in stacked relationship on said heat conducting member so that said bimetallic element is responsive to the temperature of said heat conducting member, said switch means including a pair of contacts one mounted on each of said contact arms, a portion of one of said contact arms being at all times disposed in physical engagement to provide intimate conductive heat exchange relationship with the relatively fixed end of said bimetallic element, and means for providing an effective resistance to the flow of electric current through said one of said resilient contact arms thereby to cause heating of said bimetallic element by virtue of said intimate heat exchange relationship.

9. The combination of claim 8 wherein said heat conducting member is of normally dished construction whereby warping thereof with change of temperature is substantially eliminated.

10. The combination of claim 8 wherein said bimetallic element has a free end normally spaced slightly from said one contact arm so that upon heating and deflection thereof relatively rapid movement of said one contact arm occurs upon engagement thereof by said free end of said bimetallic element thereby substantially eliminating contact arcing upon separation of said contacts.

11. A cooking vessel immersible in liquid for cleaning purposes comprising, a double wall container defined by a pair of nested inner and outer cylindrical members each closed at the bottom and open at the top, said members being joined at the top to define a first chamber between the closed bottoms thereof and a second annular chamber connected to said first chamber and completely surrounding said inner cylindrical member, electric heating means disposed in said first chamber and supported in heat exchange relationship with said inner member, a plurality of studs disposed within said annular chamber and extending between said inner and outer members, means for securing the ends of said studs adjacent said inner member to said inner member, a handle mounting plate including a plurality of spaced openings for receiving the ends of said studs not secured to said inner member, an insulating handle, means engageable with said studs for securing one end of said handle to said container, means defining a handle chamber in said handle, means including an opening in said handle mounting plate interconnecting said second chamber and said handle chamber, means for sealing the junction between said handle and container against the entrance of moisture or the like, temperature responsive switch means disposed in said first chamber, supporting means within said first chamber for supporting said last mentioned means from the cooking surface of said container, said temperature responsive means including a pair of relatively movable switch contacts, a rotatable control rod extending in said second chamber between said first chamber and said handle chamber, means on said handle mounting plate for rotatably supporting the upper end of said control rod, threaded means on said supporting means for receiving said control rod, driving means partially disposed in said handle chamber for selectively positioning said control rod, and means on said control rod for controlling the operation of said switch means.

References Cited in the file of this patent

UNITED STATES PATENTS

| | | |
|---|---|---|
| 1,842,958 | Chapman et al. | Jan. 26, 1932 |
| 2,199,638 | Lee | May 7, 1940 |
| 2,421,538 | Clark | June 3, 1947 |
| 2,518,941 | Satchwell | Aug. 15, 1950 |
| 2,528,254 | Swenson | Oct. 31, 1950 |
| 2,571,782 | Swenson | Oct. 16, 1951 |
| 2,725,460 | Braski et al. | Nov. 29, 1955 |
| 2,744,995 | Jepson | May 8, 1956 |
| 2,774,846 | Lee | Dec. 18, 1956 |

FOREIGN PATENTS

| | | |
|---|---|---|
| 664,113 | Great Britain | Jan. 2, 1952 |